United States Patent
Ly et al.

(10) Patent No.: US 11,616,633 B2
(45) Date of Patent: Mar. 28, 2023

(54) HALF-DUPLEX OPERATION IN NEW RADIO FREQUENCY DIVISION DUPLEXING BANDS

(71) Applicant: QUALCOMM Incorporated, San Diego, CA (US)

(72) Inventors: Hung Dinh Ly, San Diego, CA (US); Renqiu Wang, San Diego, CA (US); Wanshi Chen, San Diego, CA (US); Seyedkianoush Hosseini, San Diego, CA (US); Peter Pui Lok Ang, San Diego, CA (US); Peter Gaal, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 25 days.

(21) Appl. No.: 17/005,195

(22) Filed: Aug. 27, 2020

(65) Prior Publication Data

US 2021/0067308 A1 Mar. 4, 2021

Related U.S. Application Data

(60) Provisional application No. 62/894,527, filed on Aug. 30, 2019.

(51) Int. Cl.
*H04L 5/16* (2006.01)
*H04W 72/04* (2023.01)
(Continued)

(52) U.S. Cl.
CPC ................ *H04L 5/16* (2013.01); *H04L 1/08* (2013.01); *H04L 1/1816* (2013.01);
(Continued)

(58) Field of Classification Search
CPC . H04L 5/16; H04L 1/08; H04L 1/1816; H04L 5/0048; H04L 41/0803; H04W 72/042; H04W 72/10; H04W 72/14
See application file for complete search history.

(56) References Cited

U.S. PATENT DOCUMENTS

2018/0098361 A1\* 4/2018 Ji ....................... H04W 74/0866
2018/0176902 A1\* 6/2018 Huang ............. H04W 72/0413
(Continued)

OTHER PUBLICATIONS

5G New Radio: Unveiling the Essentials of the Next Generation Wireless Access Technology; Lin et al.; Ericsson; pp. 1, 3, 5-7; Jun. 18, 2018 (Year: 2018).\*

(Continued)

*Primary Examiner* — Jackie Zuniga Abad
(74) *Attorney, Agent, or Firm* — Procopio, Cory, Hargreaves & Savitch

(57) ABSTRACT

A UE may be configured for half-duplex communications. An access point may configure half-duplex UEs for efficient resource utilization using two or more different half-duplex configurations that include different timing for channels in different directions. A UE may determine a half-duplex configuration for use in communicating with the access point, each slot of the half-duplex configuration including at least a PDCCH on a downlink frequency and an uplink short burst on an uplink frequency, and each slot associated with a HARQ timeline. The UE may determine a direction for a slot. The UE may transmit or receive according to the direction for the slot and the half-duplex configuration.

31 Claims, 12 Drawing Sheets

(51) Int. Cl.
*H04L 5/00* (2006.01)
*H04W 72/14* (2009.01)
*H04L 41/0803* (2022.01)
*H04W 72/10* (2009.01)
*H04L 1/08* (2006.01)
*H04L 1/1812* (2023.01)

(52) U.S. Cl.
CPC ........ *H04L 5/0048* (2013.01); *H04L 41/0803* (2013.01); *H04W 72/042* (2013.01); *H04W 72/10* (2013.01); *H04W 72/14* (2013.01)

(56) References Cited

U.S. PATENT DOCUMENTS

| | | | |
|---|---|---|---|
| 2018/0219654 A1 | 8/2018 | Chen et al. | |
| 2018/0376473 A1* | 12/2018 | Wang | H04B 1/713 |
| 2019/0081762 A1 | 3/2019 | Yang et al. | |
| 2019/0306861 A1* | 10/2019 | Li | H04L 5/0044 |

OTHER PUBLICATIONS

International Search Report and Written Opinion—PCT/US2020/048537—ISA/EPO—dated Jan. 26, 2021.
Nokia, et al., "Summary on Half-Duplex Operation in CA Based on [95-NR-06]", 3GPP TSG-RAN WG1 Meeting #96, 3GPP Draft; R1-1902878_HD_UE_Behaviour_NOK, 3rd Generation Partnership Project (3GPP), Mobile Competence Centre; 650 Route Des Lucioles, F-06921 Sophia-Antipolis Cedex; France vol. RAN WG1, No. Athens, Greece; Feb. 25, 2019-Mar. 1, 2019, (Feb. 15, 2019), 12 Pages, XP051600576, Retrieved from Internet: URL: http://www.3gpp.org/ftp/tsg%5FranWG1%5FRL1/TSGR1%5F96/Docs/R1%2D1902878%2Ezip [retrieved Feb. 15, 2019], Whole document.
Partial International Search Report—PCT/US2020/048537—ISA/EPO—dated Nov. 11, 2020.

* cited by examiner

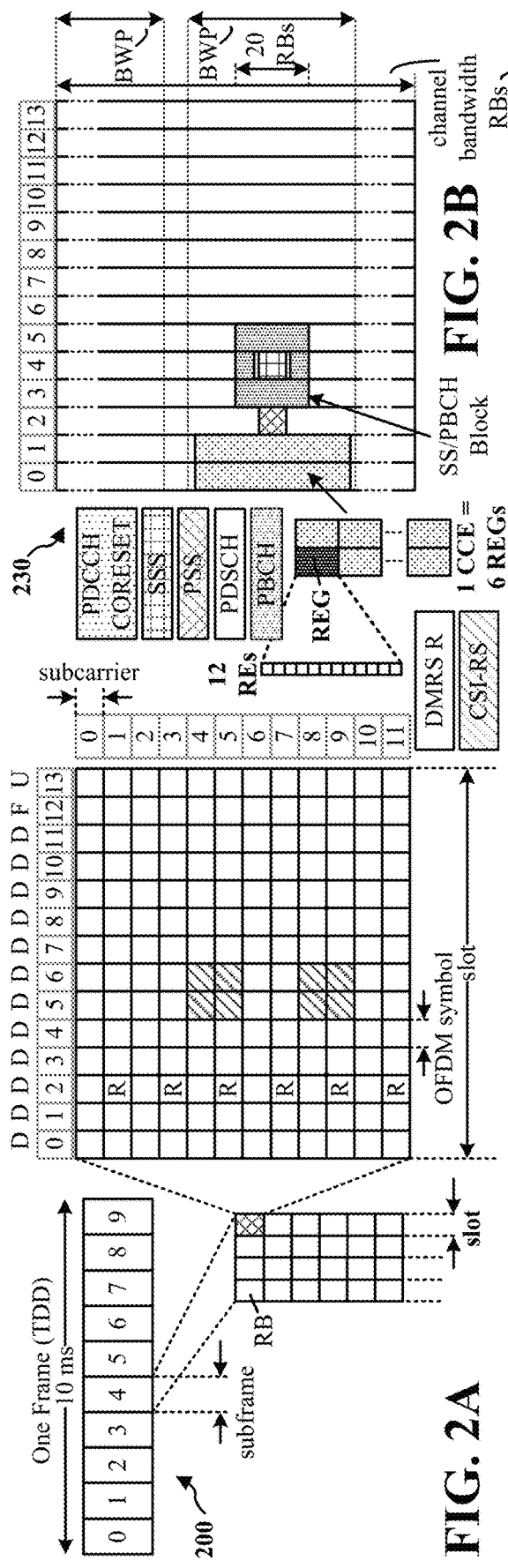
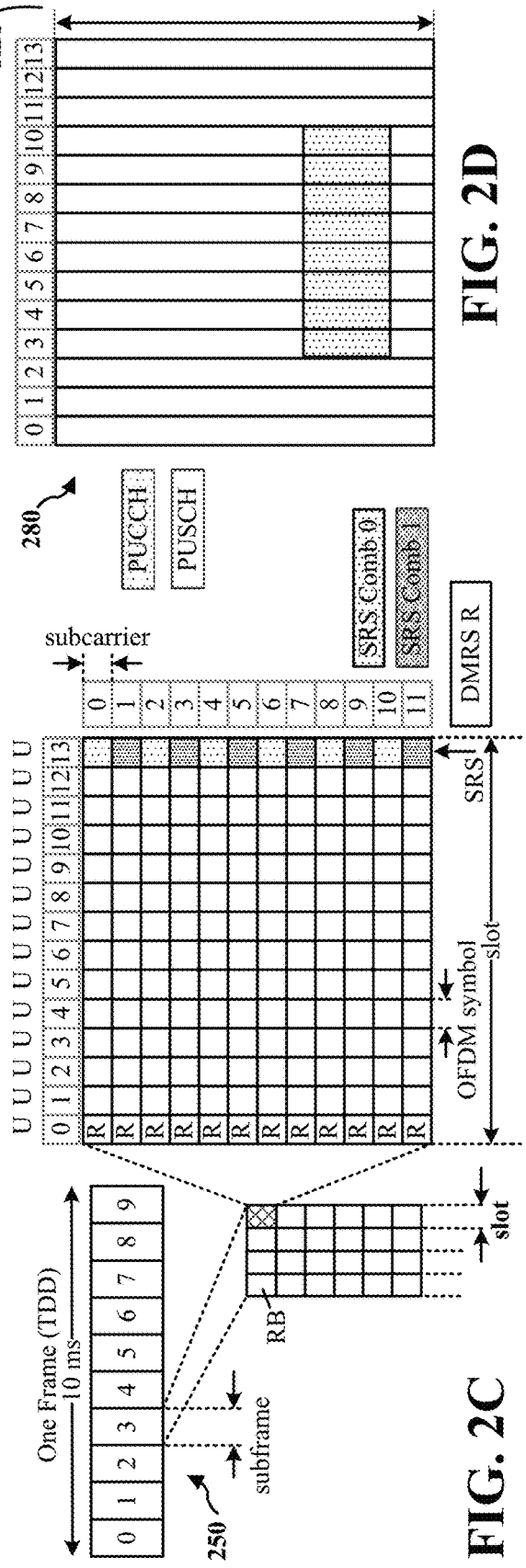
FIG. 2A
FIG. 2B
FIG. 2C
FIG. 2D

HALF-DUPLEX OPERATION IN NEW RADIO FREQUENCY DIVISION DUPLEXING BANDS

CROSS REFERENCE TO RELATED APPLICATION(S)

This application claims the benefit of U.S. Provisional Patent Application Ser. No. 62/894,527, entitled "HALF-DUPLEX OPERATION IN NEW RADIO FREQUENCY DIVISION DUPLEXING BANDS," and filed on Aug. 30, 2019, which is expressly incorporated by reference herein in its entirety.

BACKGROUND

Technical Field

The present disclosure relates generally to communication systems, and more particularly, to half-duplex communications.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In full duplex (FD) communications, a device may transmit and receive concurrently.

For example, in frequency division duplexing (FDD) communications, a device may concurrently transmit on a first frequency and receive on a second frequency. Half duplex (HD) communications for a user equipment (UE) may reduce device complexity and device cost compared to FD communications. For example, the device may not require a duplexer per FDD band, which may reduce complexity for multi-band support. HD communications, however, may not make efficient use of resources without special configuration.

A UE may be configured for half-duplex communications when operating in an FDD band. An access point may configure half-duplex UEs (e.g., UEs configured for half-duplex communications) for efficient resource utilization using two or more different half-duplex configurations that include different timing for channels in different directions. A UE may determine a half-duplex configuration for use in communicating with the access point, each slot of the half-duplex configuration including at least a physical downlink control channel (PDCCH) on a downlink frequency and an uplink short burst on an uplink frequency, and each slot associated with a hybrid automatic repeat request (HARQ) timeline. The UE may determine a direction for a slot. The UE may transmit or receive according to the direction for the slot and the half-duplex configuration.

In an aspect of the disclosure, a method, a computer-readable medium, and an apparatus are provided for wireless communication at a UE. An example apparatus determines, by the UE, a half-duplex configuration for use in communicating with an access point, each slot of the half-duplex configuration including at least a PDCCH on a downlink frequency and an uplink short burst on an uplink frequency, and each slot associated with a HARQ timeline. The example apparatus may also determine a direction for a slot. The example apparatus may also transmit or receive according to the direction for the slot and the half-duplex configuration.

In another aspect, a method, a computer-readable medium, and an apparatus are provided for wireless communication at a base station. An example apparatus may configure a first UE with a first half-duplex configuration, each slot of the first half-duplex configuration including a first physical downlink control channel (PDCCH), a first uplink short burst, and a corresponding first hybrid automatic repeat request (HARQ) timeline. The example apparatus may also configure a second UE with a second half-duplex configuration that is different than the first half-duplex configuration, each slot of the second half-duplex configuration including a second PDCCH, a second uplink short burst, and a second HARQ timeline. Additionally, the example apparatus indicates a first direction to the first UE and a second direction to the second UE for a slot. The example apparatus also transmits a first grant for a first transport block on the first PDCCH of the first UE and a second grant for a second transport block on the second PDCCH of the second UE within the slot. Additionally, the example apparatus transmits or receives the first transport block and the second transport block according to the first grant and the second grant within the slot or a subsequent slot. Further, the example apparatus transmits a retransmission request on the first PDCCH or the second PDCCH or receiving an acknowledgment or a negative acknowledgment on the first uplink short burst or the second uplink short burst for the first transport block and the second transport block according to the first HARQ timeline or the second HARQ timeline, respectively.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
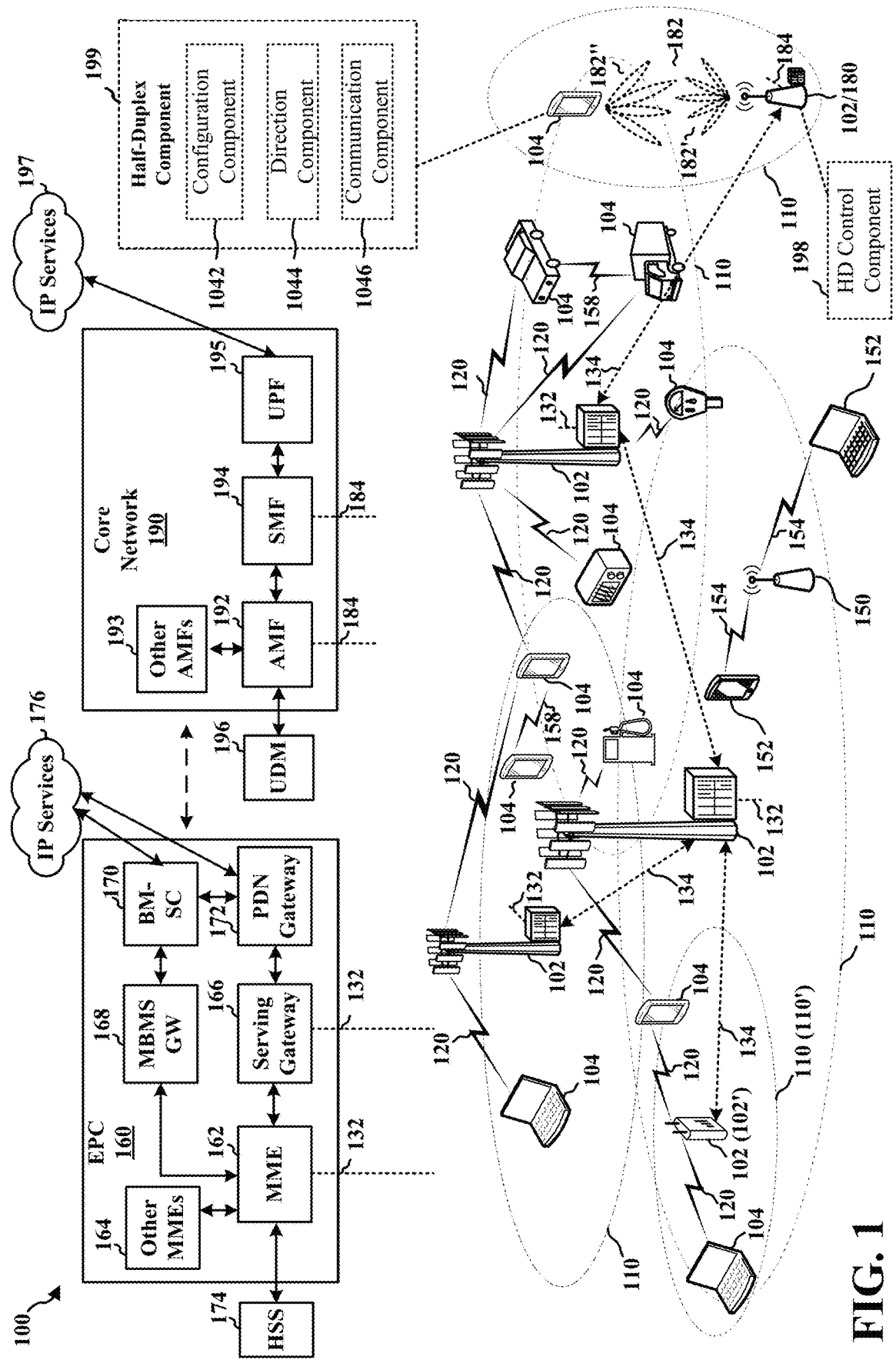
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100 comprising base stations 102/180 and UEs 104. Some wireless communication may only support full-duplex (FD) UEs in FDD bands. By enabling half-duplex (HD) UE operation, for example, in NR FDD bands, UE complexity can be significantly reduced. For example, a duplexer per FDD band may not be needed in a half-duplex UE. Accordingly, half-duplex communication may provide a significant UE complexity reduction in multi-band support. Half-duplex communications may reuse the concepts of a TDD HARQ timeline. Additionally, UE baseband implementation for TDD can be reused. Half-duplex communications may be useful for reduced capability UEs (or NR-Light UEs), which may be referred to as low-tier UEs (e.g., smart wearables, video monitoring devices, IoT devices, etc.).

Example techniques disclosed herein enable HD UE operation by reusing FDD frame structures and TDD-like HARQ timelines. The access point (e.g., a base station 102/180, a relay, etc.) may operate in either full-duplex mode or half-duplex mode in FDD bands. An HD UE (e.g., the UE 104) may be a new UE category for HD-FDD duplex mode (per band). New Tx/Rx RF requirements (e.g., maximum output power, aggregate power control tolerance, frequency error, etc.) may be defined for a HD UE.

In some examples, a wireless communication device, such as a UE 104, may be configured to manage one or more aspects of wireless communication by facilitating half-duplex operation in FDD bands. As an example, in FIG. 1, the UE 104 may include a half-duplex component 199 configured to perform half-duplex communications. For example, the half-duplex component 199 may include a configuration component 1042 configured to determine a half-duplex configuration for use in communicating with an access point (e.g., a base station 102, gNB 180, or relay device), each slot of the half-duplex configuration including at least a physical downlink control channel (PDCCH) on a downlink frequency and an uplink short burst on an uplink frequency, and each slot associated with a hybrid automatic repeat request (HARQ) timeline. In an aspect, the half-duplex configuration is different than a second half-duplex configuration of another UE. The half-duplex component 199 may include a direction component 1044 configured to determine a direction for a slot. The half-duplex component 199 may include a communication component 1046 configured to transmit or receive according to the direction for the slot and the half-duplex configuration.

In certain aspects, the base station 102/180 may include an HD control component 198 configured to perform half-duplex communications with a UE. The HD control component 198 may be configured to configure a first UE with a first half-duplex configuration, each slot of the first half-duplex configuration including a first physical downlink control channel (PDCCH), a first uplink short burst, and a corresponding first hybrid automatic repeat request (HARQ) timeline. The HD control component 198 may be configured to configure a second UE with a second half-duplex configuration that is different than the first half-duplex configuration, each slot of the second half-duplex configuration including a second PDCCH, a second uplink short burst, and a second HARQ timeline. The HD control component 198 may be configured to indicate a first direction to the first UE and a second direction to the second UE for a slot. The HD control component 198 may also be configured to transmit a first grant for a first transport block on the first PDCCH of the first UE and a second grant for a second transport block on the second PDCCH of the second UE within the slot. The HD control component 198 may be configured to transmit or receive the first transport block and the second transport block according to the first grant and the second grant within the slot or a subsequent slot. The HD control component 198 may be configured to transmit a retransmission request on the first PDCCH or the second PDCCH or receiving an acknowledgment or a negative acknowledgment on the first uplink short burst or the second uplink short burst for the first transport block and the second transport block according to the first HARQ timeline or the second HARQ timeline, respectively.

Although the following description may be focused on 5G NR, the concepts described herein may be applicable to other similar areas, such as LTE, LTE-A, CDMA, GSM, and other wireless technologies.

The wireless communications system (also referred to as a wireless wide area network (WWAN)) includes the base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Figure 3:
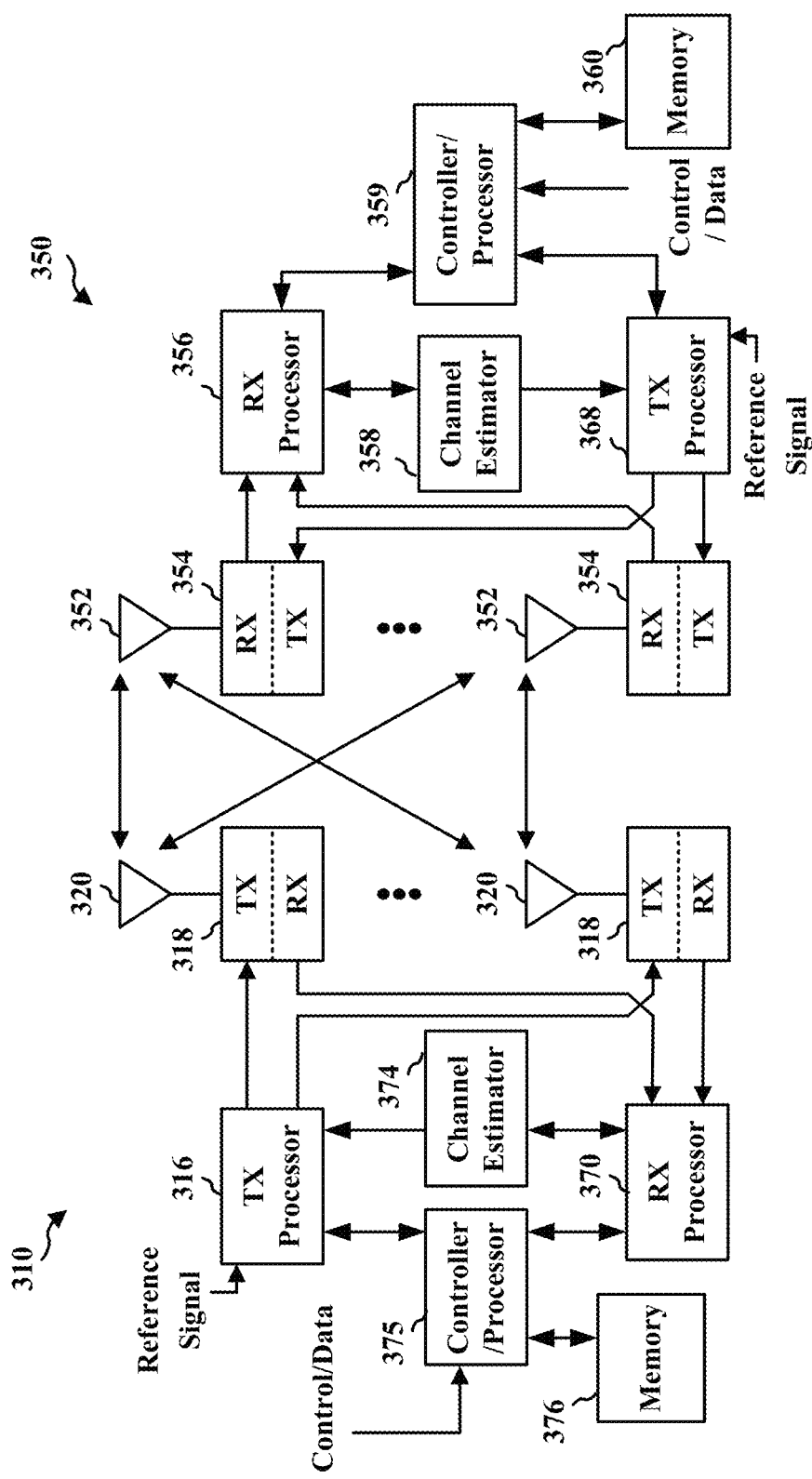
FIG. 3 is a diagram illustrating an example of a base station and a UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the half-duplex component 199 of FIG. 1.

At least one of the TX processor 316, the RX processor 370, and the controller/processor 375 may be configured to perform aspects in connection with the HD control component 198 of FIG. 1.

Some wireless communication may only support full-duplex (FD) UEs in FDD bands. By enabling HD UE operation, for example, in NR FDD bands, UE complexity can be significantly reduced. For example, a duplexer per FDD band may not be needed in a half-duplex UE. Accordingly, half-duplex communication may provide a significant UE complexity reduction in multi-band support. In some examples, half-duplex communications may reuse the concepts of a TDD HARQ timeline. Additionally, UE baseband implementation for TDD can be reused. Half-duplex communications may be useful for reduced capability UEs, which may be referred to as low-tier UEs (e.g., smart wearables, video monitoring devices, IoT devices, etc.).

Example techniques disclosed herein enable HD UE operation by reusing FDD frame structures and TDD-like HARQ timelines. The access point (e.g., a base station 102, gNB 180, or a relay) may operate in either full-duplex mode or half-duplex mode in FDD bands. An HD UE may be a new UE category for HD-FDD duplex mode (per band). New Tx/Rx RF requirements (e.g., maximum output power, aggregate power control tolerance, frequency error, etc.) may be defined for a HD UE.

Figure 4:
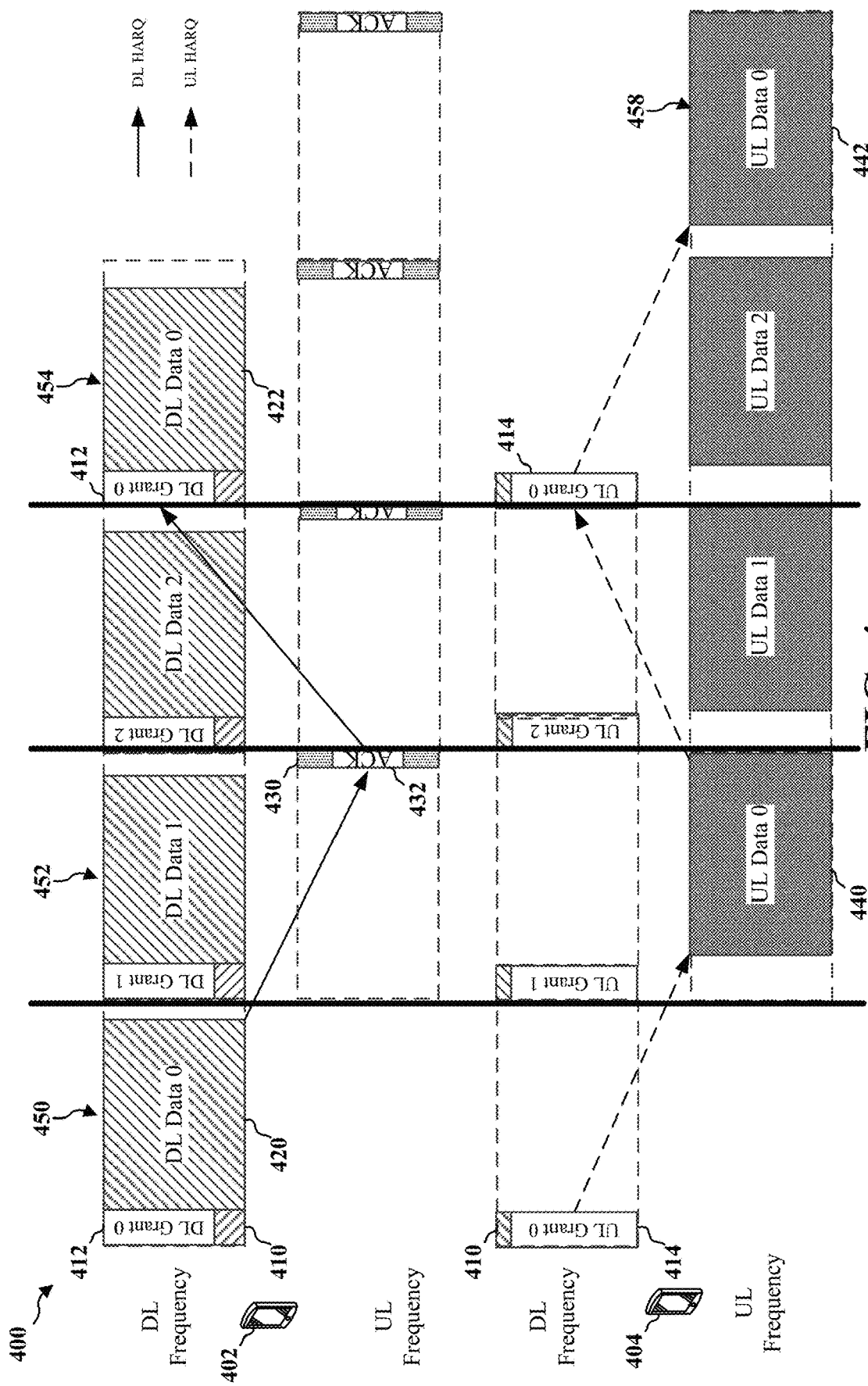
FIG. 4 is a diagram of an example half-duplex configuration for UEs.

Turning to FIG. 4, a baseline HARQ timeline design 400 may be used for a first HD UE 402 with three downlink HARQ processes and a second HD UE 404 with three uplink HARQ processes. The first HD UE 402 may receive a DL grant 412 for a first HARQ process (e.g., process 0) on a PDCCH 410 in a first slot 450. The DL grant 412 may indicate a transport block 420 for DL data for the first HARQ process in the first slot 450. The transport block 420 may be transmitted on a PDSCH. According to the baseline HARQ timeline design 400, the first HD UE 402 may transit an acknowledgment (ACK) 432 or negative acknowledgment (NACK) in an UL short burst 430 of a subsequent slot (e.g., a second slot 452). The UL short burst 430 may include one or more symbols designated for UL transmission. The UL short burst 430 may carry a PUSCH and may be referred to as a PUSCH. Accordingly, the first HD UE 402 may receive a DL grant 412 for the first HARQ process in a later slot (e.g., a fourth slot 454). The DL grant 412 may indicate a transport block 422, which may be a new transmission in the case of an ACK, or a retransmission in the case of a NACK.

The second HD UE 404 may receive an UL grant 414 on the PDCCH 410 in the first slot 450. The UL grant 414 may schedule an UL transport block 440 in the second slot 452. For example, the UL transport block 440 may be transmitted on an UL long burst. The UL long burst may be a plurality of symbols designated for an UL transmission. In an aspect, the UL long burst may carry a PUSCH and may be referred to as a PUSCH. In an aspect, the PUSCH and the PDSCH may share the same time domain resources (e.g., symbols), but may be frequency division duplexed (FDD). However, since the HD UEs 402, 404 are configured for HD communications, each of the HD UEs 402, 404 may either transmit PUSCH or receive PDSCH. The access point, however, may be full duplex and may, for example, transmit PDSCH to a first UE and receive PUSCH from a second UE in the same slot. The access point may ACK/NACK the transport block 440 in the UL grant 414 (e.g., using a new data indicator (NDI)), which may be for a second UL transport block 442 in a later slot (e.g., a fifth slot 458). Accordingly, the transport block 442 may be anew transmission in the case of an ACK, or a retransmission in the case of a NACK.

Figure 5:
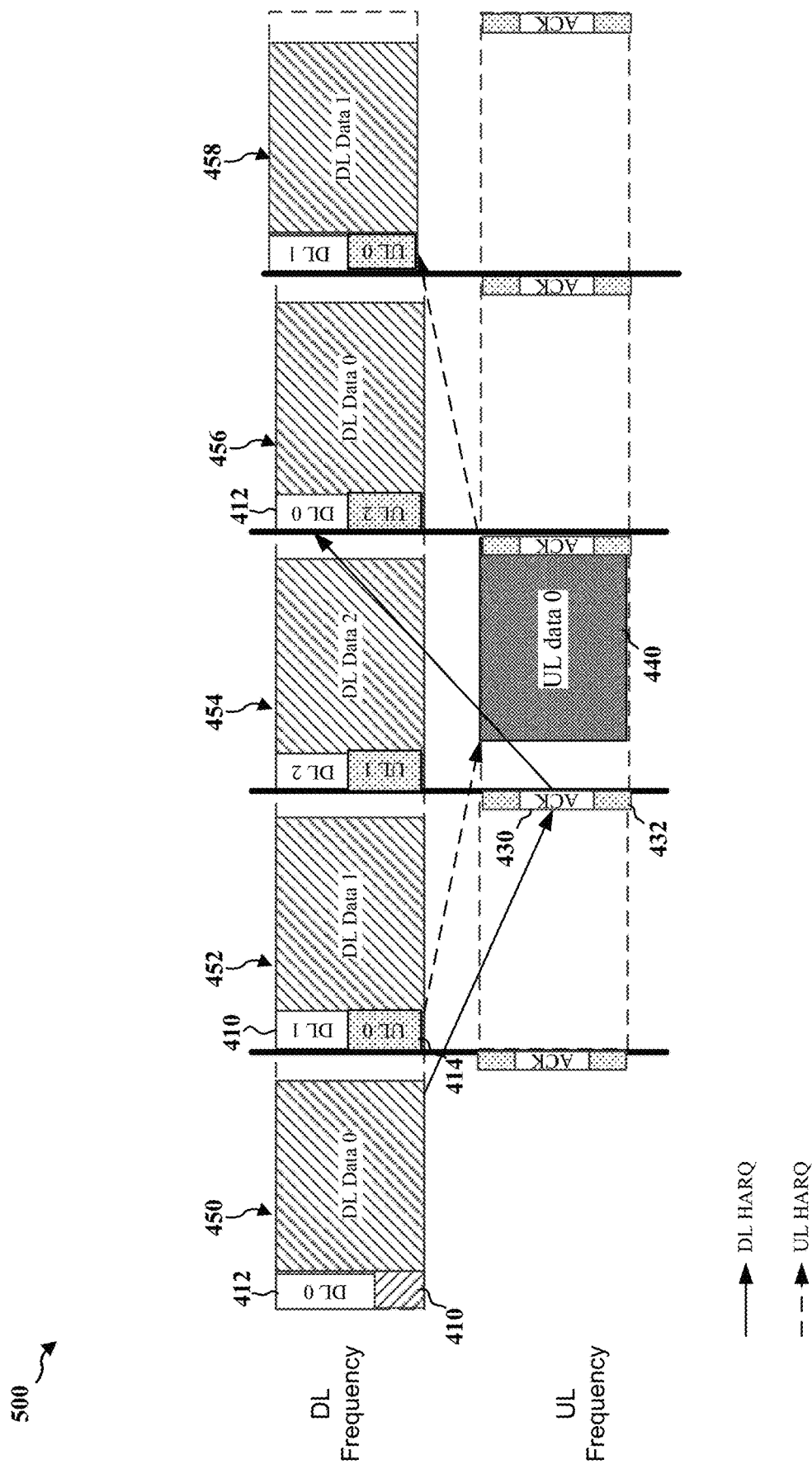
FIG. 5 is a diagram of the example half-duplex configuration of FIG. 4 for an access point.

Turning to FIG. 5, a combined HARQ timeline design 500 includes transmissions for both the first HD UE 402 and the second HD UE 404 (of FIG. 4) according to the baseline HARQ timeline design 400. The combined HARQ timeline design 500 may illustrate the perspective of an access point for resource utilization. For simplicity, the HARQ timelines for only the first DL HARQ process and first UL HARQ process are illustrated in FIG. 5. Additionally, only a single UL transport block 440 is illustrated.

According to the baseline HARQ timeline design 400, both the first HD UE 402 and the second HD UE 404 share the same PDCCH time domain resources (e.g., a first symbol in each slot) and the same UL short burst time domain resources (e.g., a last symbol in each slot). Because the HD UEs 402, 404 are configured for HD communications, during the PDCCH 410, neither one of the HD UEs 402, 404 can transmit on the UL frequency. Similarly, during the UL short burst 430, neither one of the HD UEs 402, 404 can receive on the DL frequency. From the perspective of the access point, which may be configured for FD communications, these time domain resources may be unused. Accordingly, in an aspect, it may be desirable to improve resource utilization for communications involving HD UEs.

Figure 6:
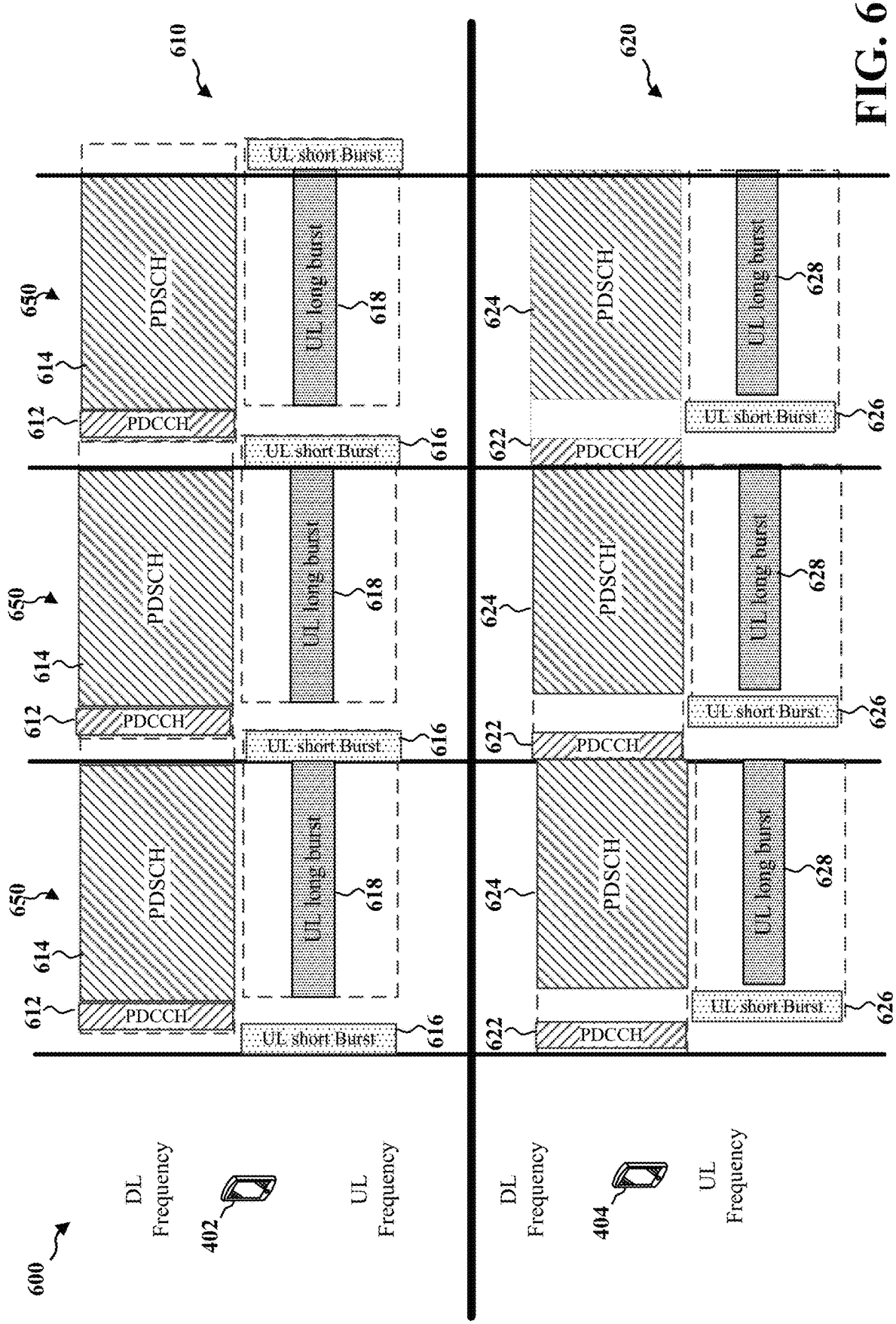
FIG. 6 is a diagram of different half-duplex configurations for UEs.

FIG. 6 illustrates a timeline 600 including a first HD configuration 610 for the first HD UE 402 of FIG. 4 and a second HD configuration 620 for a second HD UE 404 of FIG. 4. The first HD configuration 610 may include a first PDCCH 612 and a first UL short burst 616 in each slot 650. Each slot 650 may be associated with a DL direction or an UL direction and include one of a PDSCH 614 or an UL long burst 618 depending on the direction of the respective slot 650. The second HD configuration 620 may include a second PDCCH 622 and a second UL short burst 626 in each slot 650. Each slot 650 may have a DL direction or an UL direction and include one of a PDSCH 624 or an UL long burst 628 depending on the direction of the slot 650.

The first PDCCH 612 may have a different timing than the second PDCCH 622. For example, the first PDCCH 612 may be in a second symbol of the slot 650 and the second PDCCH 622 may be in the first symbol of the slot 650. The PDCCH regions may be disjoint for the first PDCCH 612 and the second PDCCH 622. The first UL short burst 616 may have a different timing than the second UL short burst 626. For example, the first UL short burst 616 may be in the first symbol of the slot 650 and the second UL short burst 626 may be in the second symbol of the slot 650. Aspects of the example timeline 600 may enable an access point (e.g., a base station 102/180, a relay, etc.) to divide HD UEs into K groups, with K being an integer greater than one. The K groups may have disjoint PDCCH regions and disjoint UL short burst regions. The K groups may have different HARQ timelines, e.g., one HARQ timeline may differ from another HARQ timeline by a number of symbols. The number of symbols may be 1, 2, etc. A timing gap between uplink slots or subframes may be fixed. The timing gap may be signaled to a UE. The timing gap may be derived, such as from a PDCCH time domain allocation.

Figure 7:
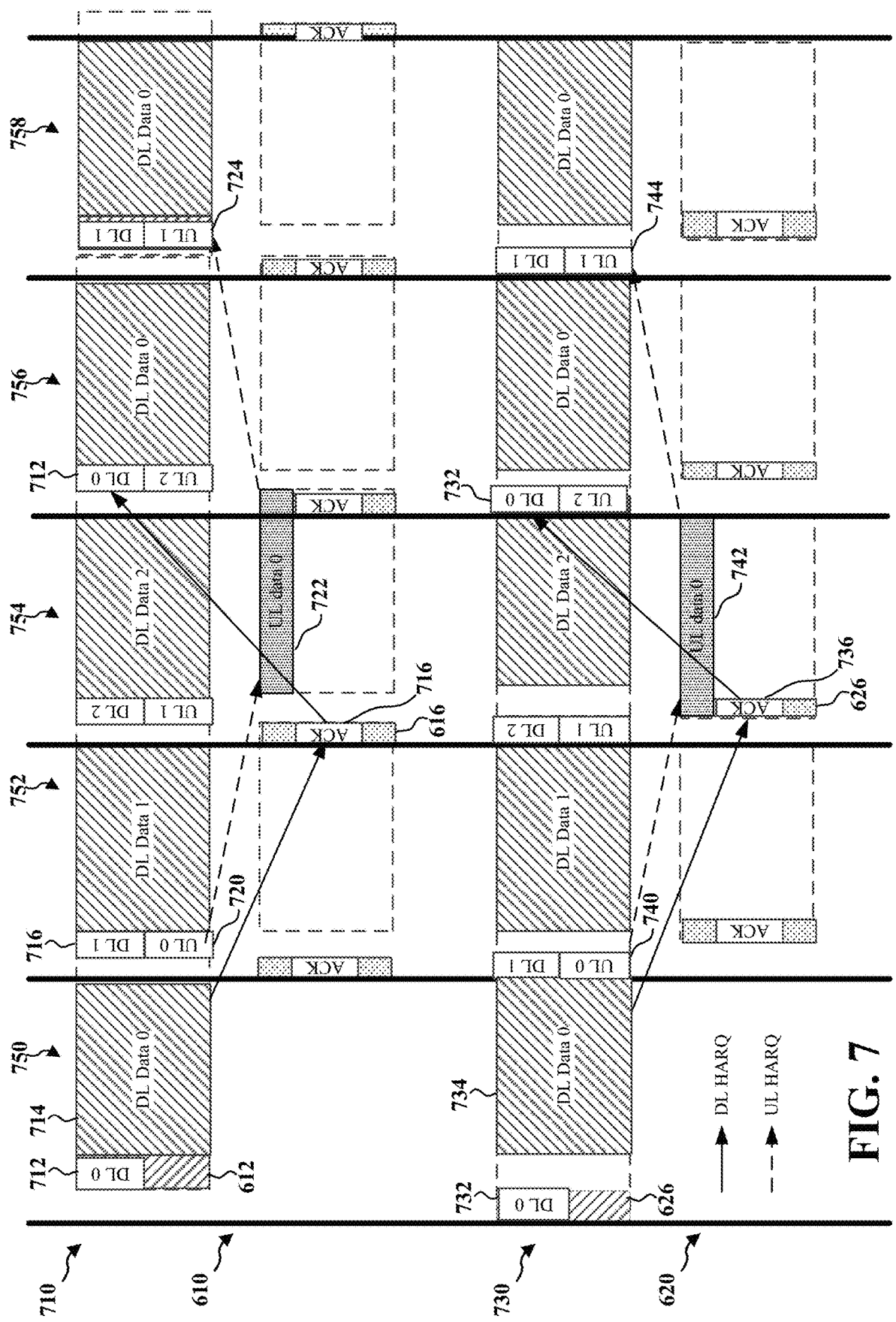
FIG. 7 is a diagram of HARQ timelines for the different half duplex-configurations of FIG. 6.

Turning to FIG. 7, a first HARQ timeline 710 may be used for UEs configured with the first HD configuration 610 and a second HARQ timeline 730 may be used for UEs configured with the second HD configuration 620. According to the first HARQ timeline 710, the first HD UE 402 configured with the first HD configuration 610 may receive a DL grant 712 for a first HARQ process on the first PDCCH 612 in a first slot 750. The DL grant 712 may be received during a second symbol of the slot 750 according to the first HD configuration 610. The DL grant 712 may indicate resources for a DL transport block 714 to be transmitted on the PDSCH 614. The first HD UE 402 may transmit an ACK/NACK 716 on the first UL short burst 616 in a subsequent slot (e.g., a third slot 754). The ACK/NACK 716 may be transmitted during a first symbol of the slot 754 according to the first HD configuration 610. Accordingly, in a later slot (e.g., a fourth slot 756), the first HD UE 402 may receive another DL grant 712 for the first HARQ process on the first PDCCH 612.

In an aspect, the third slot 754 may be an UL slot for the first HD UE 402. The first HD UE 402 may receive an UL grant 720 in the first PDCCH 612 of the second slot 752 indicating resources for an UL transport block 722. The UL grant 720 may be transmitted on the second symbol of the second slot 752. The first HD UE 402 may transmit the UL transport block 722 on the UL long burst 618 in the third slot 754. In an aspect, the UL transport block 722 may also use resources (e.g., a first symbol) in the first UL short burst 616 of the fourth slot 756. The access point may acknowledge the UL transport block 722 in an UL grant 724 on the first PDCCH 612 in the fifth slot 758.

For the second HARQ timeline 730, the second HD UE 404 configured with the second HD configuration 620 may receive a DL grant 732 for a first HARQ process on the second PDCCH 622 in a first slot 750. The DL grant 732 may be received during a first symbol of the slot 750 according to the second HD configuration 620. The DL grant 732 may indicate resources for a DL transport block 734 to be transmitted on the PDSCH 624. The second HD UE 404 may transmit an ACK/NACK 736 on the second UL short burst 626 in a subsequent slot (e.g., a third slot 754). The ACK/NACK 736 may be transmitted during a second symbol of the slot 754 according to the second HD configuration 620. Accordingly, in a later slot (e.g., a fourth slot 756), the second HD UE 404 may receive another DL grant 732 for the first HARQ process on the second PDCCH 622.

In an aspect, the third slot 754 may be an UL slot for the second HD UE 404. The second HD UE 404 may receive an UL grant 740 in the second PDCCH 622 of the second slot 752 indicating resources for an UL transport block 742. The UL grant 740 may be transmitted on the first symbol of the second slot 752. The second HD UE 404 may transmit the UL transport block 742 on the UL long burst 628 in the third slot 754. In an aspect, the UL transport block 742 may also use resources (e.g., the second symbol) in the second UL short burst 626 of the third slot 754. The access point may acknowledge the UL transport block 742 in an UL grant 744 on the PDCCH 622 in the fifth slot 758.

Referring again to FIG. 6, each slot 650 of an HD configuration may have a direction of either DL or UL. The direction may refer to a direction of resources associated with a transport block within the slot and whether the PDSCH 614 or the UL long burst 618 is utilized. In an aspect, the direction of the slot may be semi-statically configured for each UE. For example, the HD configuration may define a direction pattern similar to a TDD frame structure. The direction pattern may repeat after a number of slots (e.g., 5 or 10 slots). Accordingly, one or both of the HD UEs 402, 404 may determine a direction of a slot based on the direction pattern. The access point may configure different UEs with the same HD configuration but different direction patterns. Accordingly, the access point may configure a group of HD UEs having the same HD configuration to utilize both the UL frequency and the DL frequency for efficient resource utilization. A semi-static direction pattern may also prevent conflicts between different channels within a slot.

Conflicts of direction may occur when dynamic scheduling of one or more channels is allowed. For example, the access point may dynamically schedule a UE for PDSCH, PUSCH, or ACK using a grant on the PDCCH. The access point may also semi-statically configure the PDSCH, PUSCH, or ACK, for example, using semi-persistent scheduling (SPS) or a configured grant (CG). The PDCCH 612, 622 may be semi-statically configured by the HD configuration. Another channel, such as a channel state information report or reference signal, may be periodic or may be semi-persistently scheduled. The access point may generally avoid conflicts in link direction by scheduling dynamic PDSCH, PUSCH, or ACK in a slot with other channels in the same direction. In an aspect, however, the access point may schedule a conflict to increase flexibility, for example, for a high priority channel. The HD UEs 402, 404 may be configured with a priority rule for determining a direction of the slot when there are conflicting channels scheduled in the slot. In some examples, the HD UEs 402, 404 may determine the direction of the slot to be the direction of the highest priority channel. For instance, an example priority rule may define ACK/NACK as the highest priority, followed by dynamic PDSCH or PUSCH, CSI, and finally semi-persistent PDSCH, PUSCH, or ACK.

Figure 8B:
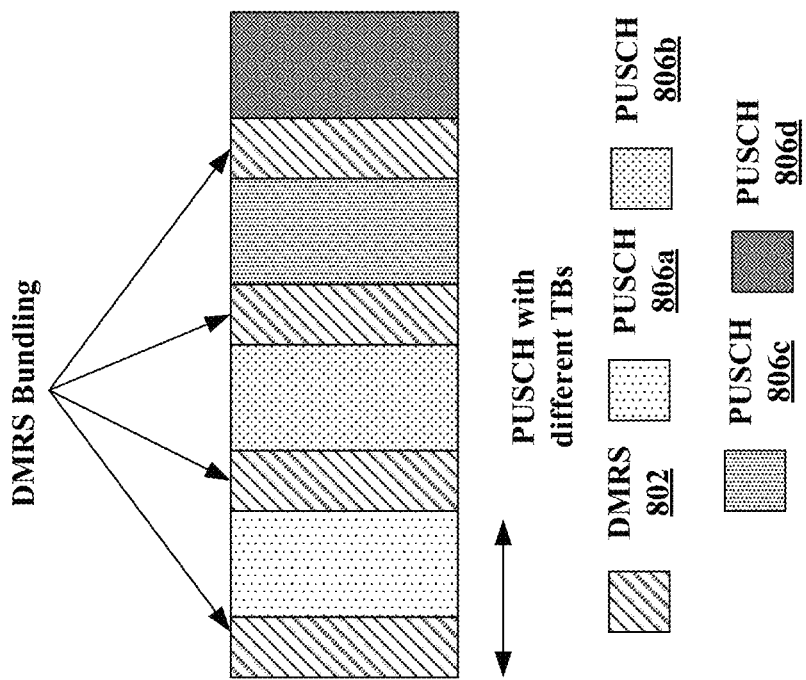
FIGS. 8A and 8B illustrate examples of demodulation reference signal (DMRS) bundling.
Figure 8A:
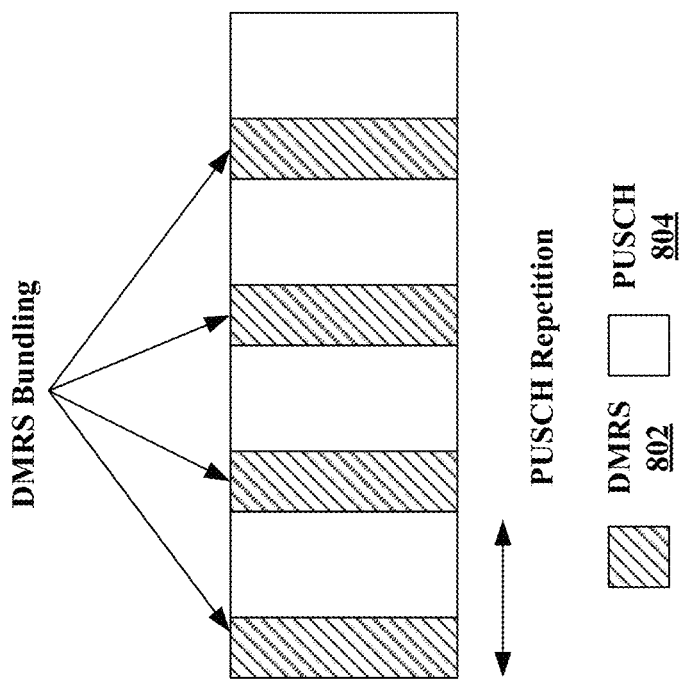

Another type of direction conflict may occur with demodulation reference signals (DMRS). A DMRS may be transmitted with an uplink transport block on the PUSCH. DMRS bundling may refer to transmitting a DMRS over multiple slots for coherent combining. With DMRS bundling, PUSCH DMRS over multiple DMRS symbols are transmitted with carrier phase continuity and same phase continuity of precoding matrix or at least same phase continuity of precoding matrix. DMRS can be coherently transmitted over different time instances (e.g., slots). At the receiver (e.g., access point), a channel estimate from DMRS in different time instances can be coherently combined to enhance the channel estimation performance. PUSCH DMRS bundling may be applied for DMRS 802 transmitted with PUSCH 804 repetition over multiple slots, as shown in FIG. 8A, or PUSCHs 806*a*, 806*b*, 806*c*, 806*d* carrying different transport blocks, as shown in FIG. 8B.

PUSCH DMRS bundling may conflict with a periodic measurement (e.g., periodic CSI, radio resource management (RRM)) or periodic DL reception/monitoring (e.g., DL broadcast channels) that might be scheduled in UL slots where PUSCH DMRS bundling is configured for an HD UE. In a first example, the HD UE may perform partial DMRS bundling on symbols that do not collide with periodic measurement/DL reception. In a second example, the HD UE may perform DMRS bundling, and may not perform periodic measurement/DL reception in a slot in the case of a conflict. In a third example, the HD UE may disable DMRS bundling and perform periodic measurement/DL reception. In a fourth example, whether PUSCH bundling can or cannot be impacted may be configurable. For example, the HD configuration may indicate which option to follow. In a fifth example, the UE may perform PUSCH DMRS bundling based on a priority of the PUSCH transmission. For example, a high priority transmission (e.g., URLLC) may follow the second example, while a lower priority transmission (e.g., eMBB) may follow the first example or the third example. The priority of the PUSCH can be indicated at the PHY layer (e.g., using DCI size/format, DCI bit field, RNTI, CORESET or search space set index) or at the MAC layer (based on the logical channel (LCH) prioritization).

Figure 9:
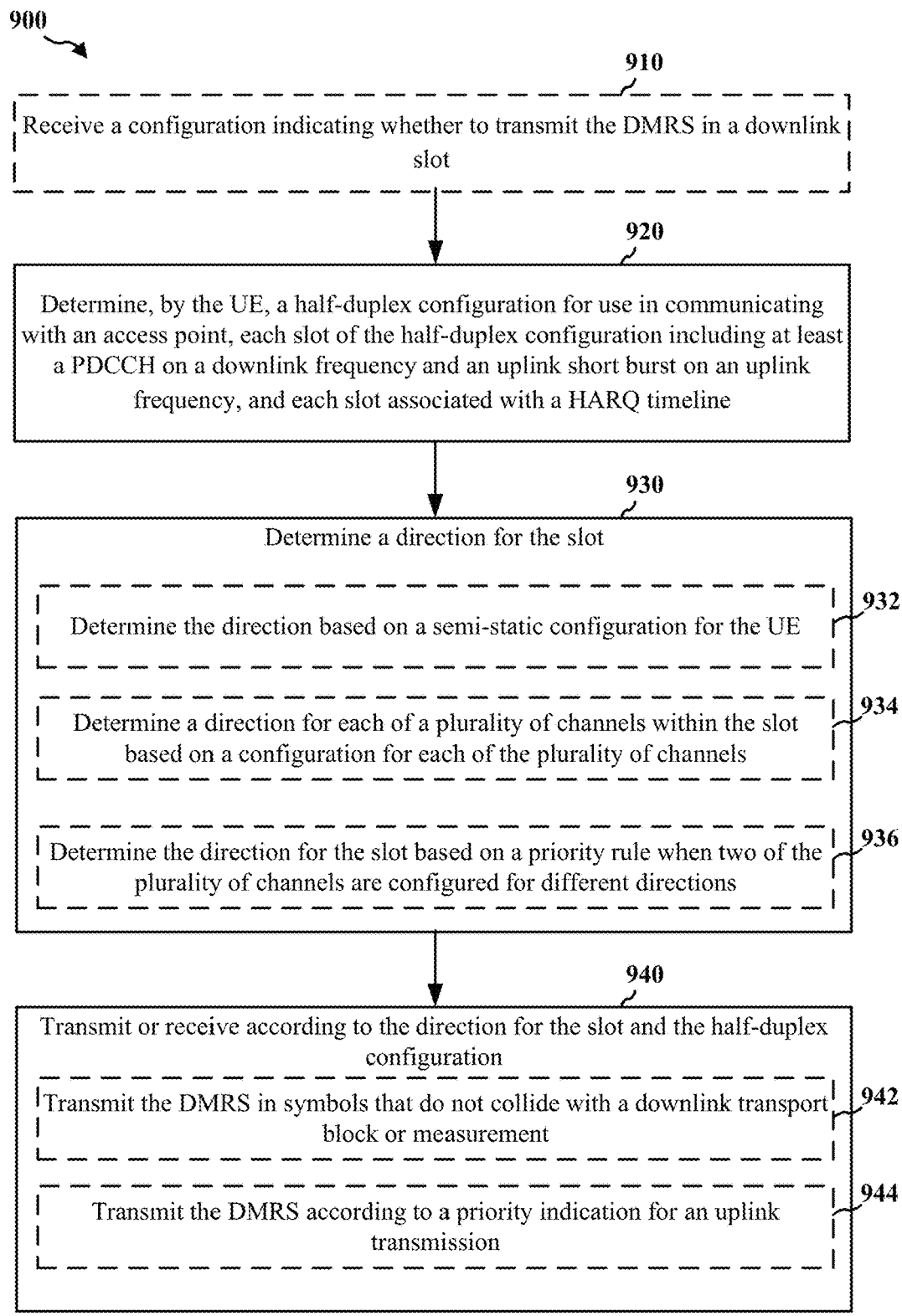
FIG. 9 is a flowchart of a method of wireless communication at a UE, in accordance with the teachings disclosed herein.

FIG. 9 is a flowchart 900 of a method of wireless communication. The method may be performed by a UE (e.g., the UE 104; the apparatus 1002). Optional aspects are illustrated with a dashed line. The method may facilitate reducing UE complexity by enabling HD UE operation in FDD bands.

At 910, the UE may receive a configuration indicating whether to transmit a DMRS in a downlink slot, as described above in connection with FIGS. 8A and 8B. For example, the receiving of the configuration indicating whether to transmit the DMRS in a downlink slot may be performed by a configuration component 1042 of the apparatus 1002. For example, the configuration may be an RRC configuration message indicating whether to prioritize DMRS over downlink transmissions.

At 920, the UE determines a half-duplex configuration for use in communicating with an access point, each slot of the half-duplex configuration including at least a PDCCH on a downlink frequency and an UL short burst on an uplink frequency, and each slot associated with a HARQ timeline, as described in connection with the HD configurations 610, 620 of FIGS. 6 and/or 7. For example, the determining of the half-duplex configuration for use in communication with the access point may be performed by the configuration component 1042 of the apparatus 1002. For example, the UE 104 may execute the configuration component 1042 to determine the HD configuration 610, 620 for use in communicating with the access point (e.g., base station 102, gNB 180), each slot of the half-duplex configuration including at least a PDCCH 612, 622 on a downlink frequency and an UL short burst 616, 626 on an uplink frequency, and each slot associated with a HARQ timeline 710, 730. In some examples, the configuration component 1042 may receive the HD configuration 610, 620 via an RRC configuration message. In some examples, the HD configuration 610, 620 may be one of a plurality of possible half-duplex configurations that may be assigned to one or more UEs such that the half-duplex configuration for the UE 104 may be different than the half-duplex configuration of another UE communicating with the access point. In some examples, the half-duplex configuration may be indicated by an index into a set of half-duplex configurations defined in a standards document or regulation.

At 930, the UE may determine a direction for the slot, as described in connection with the HD configurations 610, 620 of FIGS. 6 and/or 7. For example, the determining of the direction for the slot may be performed by a direction component 1044 of the apparatus 1002.

In some examples, the UE may determine, at 932, the direction for the slot based on a semi-static configuration for the UE, as described in connection with the slots 650 of FIG. 6. For example, the direction component 1044 may determine the direction based on a direction pattern indicated in the HD configuration. In some examples, the UE may determine the direction according to a position of the slot within the direction pattern.

In some examples, the UE may determine, at 934, the direction for each of a plurality of channels within the slot based on a configuration for each of the plurality of channels, as described in connection with the slots 650 of FIG. 6. For example, the direction component 1044 may be configured to determine the direction for each of a plurality of channels within the slot based on a configuration for each of the plurality of channels. The plurality of channels may include any channel or signal scheduled during the slot. For example, the channels may include one of more of: a transport block, PDSCH, PUSCH, PDCCH, PUCCH, CSI, or ACK/NACK. In some examples, at least one of the plurality of channels may be dynamically configured for the slot. In some examples, the direction of one or more of the channels may conflict. For example, one channel may have an uplink direction and another channel may have a downlink direction. It may be appreciated that an HD UE may be unable to operate in the uplink direction and downlink direction for the same slot.

In some examples, the UE may determine, at 936, the direction for the slot based on a priority rule when two of the plurality of channels are configured for different directions. For example, the direction component 1044 may be configured to determine the direction for the slot based on the priority rule. In some examples the UEE may select the direction of a highest priority scheduled channel as the direction of the slot. Accordingly, the highest priority channel, as well as other channels in the same direction, may be transmitted or received during the slot.

At 940, the UE transmits or receives according to the direction for the slot and the half-duplex configuration, as described in connection with the UL long bursts 618, 628 or the PDSCH 614, 624 of FIG. 6. For example, a communication component 1046 of the apparatus 1002 may be configured to transmit or receive according to the direction for the slot and the half-duplex configuration. For an uplink direction, the UE may control a transmitter to transmit an uplink transport block on the UL long burst 618 or UL long burst 628 depending on the HD configuration 610, 620, respectively. Conversely, for the downlink direction, the UE may control a receiver to receive the PDSCH 614 or PDSCH 624 depending on the HD configuration 610, 620, respectively.

In examples in which the UE is configured for DMRS bundling, the UE may transmit the DMRS in symbols that do not collide with a downlink transport block or measurement, as described in connections with FIGS. 8A and 8B. For example, a DMRS component 1040 of the apparatus 1002 may be configured to transmit the DMRS in symbols that do not collide with a downlink transport block or measurement. For example, the UE may control the transmitter to transmit the DMRS in symbols that do not collide with the downlink transport block or measurement. The UE may control the receiver to receive the downlink transport block or perform the measurement in the other symbols of the slot.

In some examples, the UE may transmit the DMRS according to a priority indication for an uplink transmission, as described in connection with FIGS. 8A and 8B. For example, the DMRS component 1040 of the apparatus 1002 may be configured to transmit the DMRS according to the priority indication for an uplink transmission. For instance, the UE may control the transmitter to transmit the DMRS if the uplink transmission is indicated as a priority transmission or has a priority that satisfies a threshold. The priority indication may be one of a DCI format, a DCI bit field, a RNTI, a CORESET or search space set index, or a logical channel.

Figure 10:
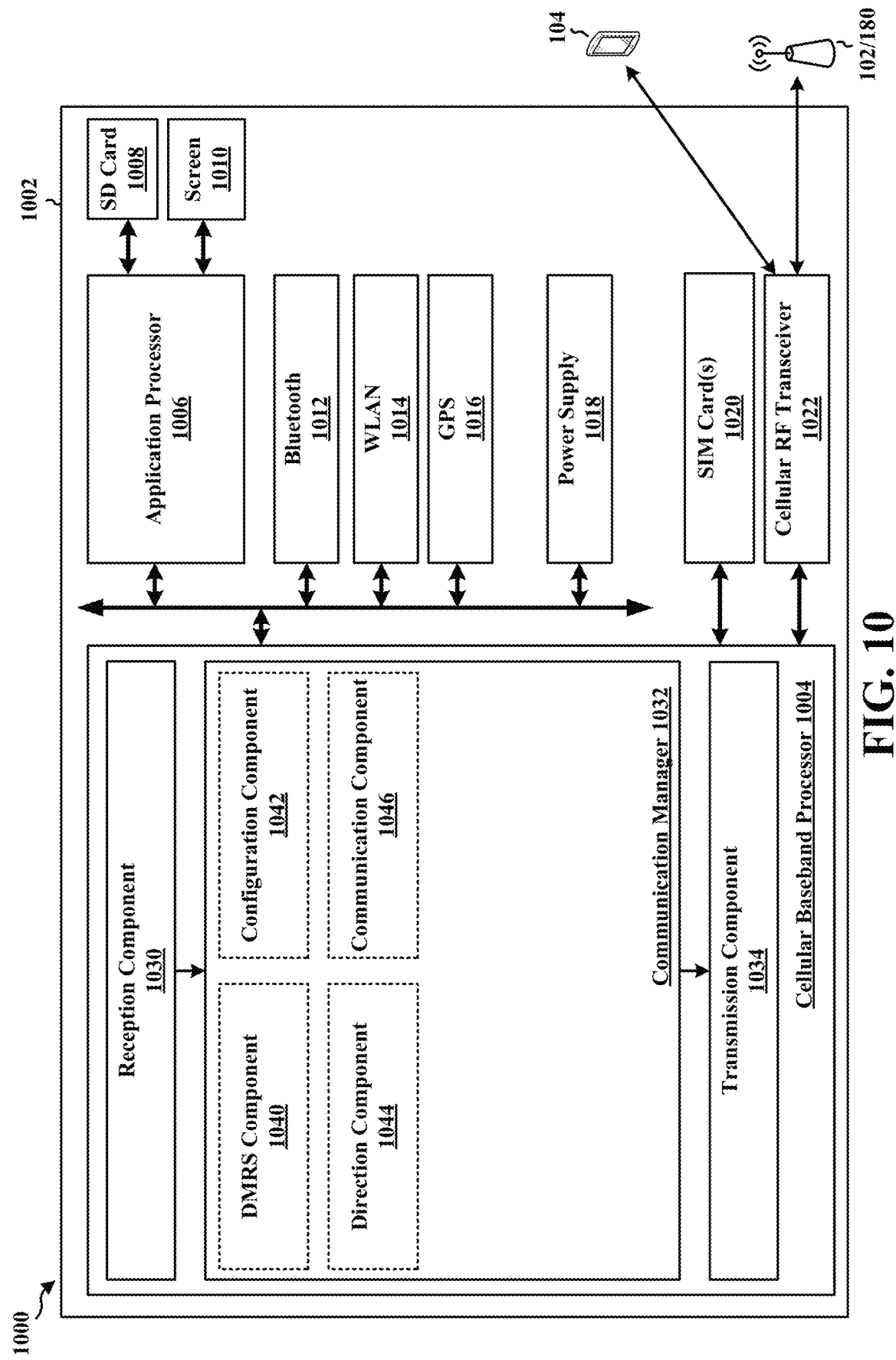
FIG. 10 is a diagram illustrating an example of a hardware implementation for an example apparatus, in accordance with the teachings disclosed herein.

FIG. 10 is a diagram 1000 illustrating an example of a hardware implementation for an apparatus 1002. The apparatus 1002 is a UE and includes a cellular baseband processor 1004 (also referred to as a modem) coupled to a cellular RF transceiver 1022 and one or more subscriber identity modules (SIM) cards 1020, an application processor 1006 coupled to a secure digital (SD) card 1008 and a screen 1010, a Bluetooth module 1012, a wireless local area network (WLAN) module 1014, a Global Positioning System (GPS) module 1016, and a power supply 1018. The cellular baseband processor 1004 communicates through the cellular RF transceiver 1022 with the UE 104 and/or base station 102/180. The cellular baseband processor 1004 may include a computer-readable medium/memory. The computer-readable medium/memory may be non-transitory. The cellular baseband processor 1004 is responsible for general processing, including the execution of software stored on the computer-readable medium/memory. The software, when executed by the cellular baseband processor 1004, causes the cellular baseband processor 1004 to perform the various functions described supra. The computer-readable medium/memory may also be used for storing data that is manipulated by the cellular baseband processor 1004 when executing software. The cellular baseband processor 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the cellular baseband processor 1004. The cellular baseband processor 1004 may be a component of the UE 350 and may include the memory 360 and/or at least one of the TX processor 368, the RX processor 356, and the controller/processor 359. In one configuration, the apparatus 1002 may be a modem chip and include just the baseband processor 1004, and in another configuration, the apparatus 1002 may be the entire UE (e.g., see the UE 350 of FIG. 3) and include the aforediscussed additional modules of the apparatus 1002.

The communication manager 1032 includes a DMRS component 1040 that is configured to transmit the DMRS in symbols that do not collide with a downlink transport block or measurement and/or transmit the DMRS according to the priority indication for an uplink transmission, for example, as described in connection with 942 and/or 944 of FIG. 9. The communication manager 1032 further includes a configuration component 1042 that facilitates determining an HD configuration, for example, as described in connection with 910 and/or 920 of FIG. 9. The communication manager 1032 further includes a direction component 1044 that facilitates determining a direction of a slot, for example, as described in connection with 930, 932, 934, and/or 936 of FIG. 9. The communication manager 1032 further includes a communication component 1046 that facilitates transmitting an UL transport block or receiving a DL transport block, for example, as described in connection with 940 of FIG. 9.

The apparatus may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the cellular baseband processor 1004, includes means for determining, by the UE, a half-duplex configuration for use in communicating with an access point, each slot of the half-duplex configuration including at least a PDCCH on a downlink frequency and an uplink short burst on an uplink frequency, and each slot associated with a HARQ timeline. The example apparatus 1002 may also include means for determining a direction for a slot. The example apparatus 1002 may also include means for transmitting or receiving according to the direction for the slot and the half-duplex configuration. The example apparatus 1002 may also include means for transmitting a DMRS across a plurality of slots, wherein transmitting or receiving according to the direction for the slot and the half-duplex configuration is further based on the DMRS for the slot.

The aforementioned means may be one or more of the aforementioned components of the apparatus 1002 configured to perform the functions recited by the aforementioned means. As described supra, the apparatus 1002 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 11:
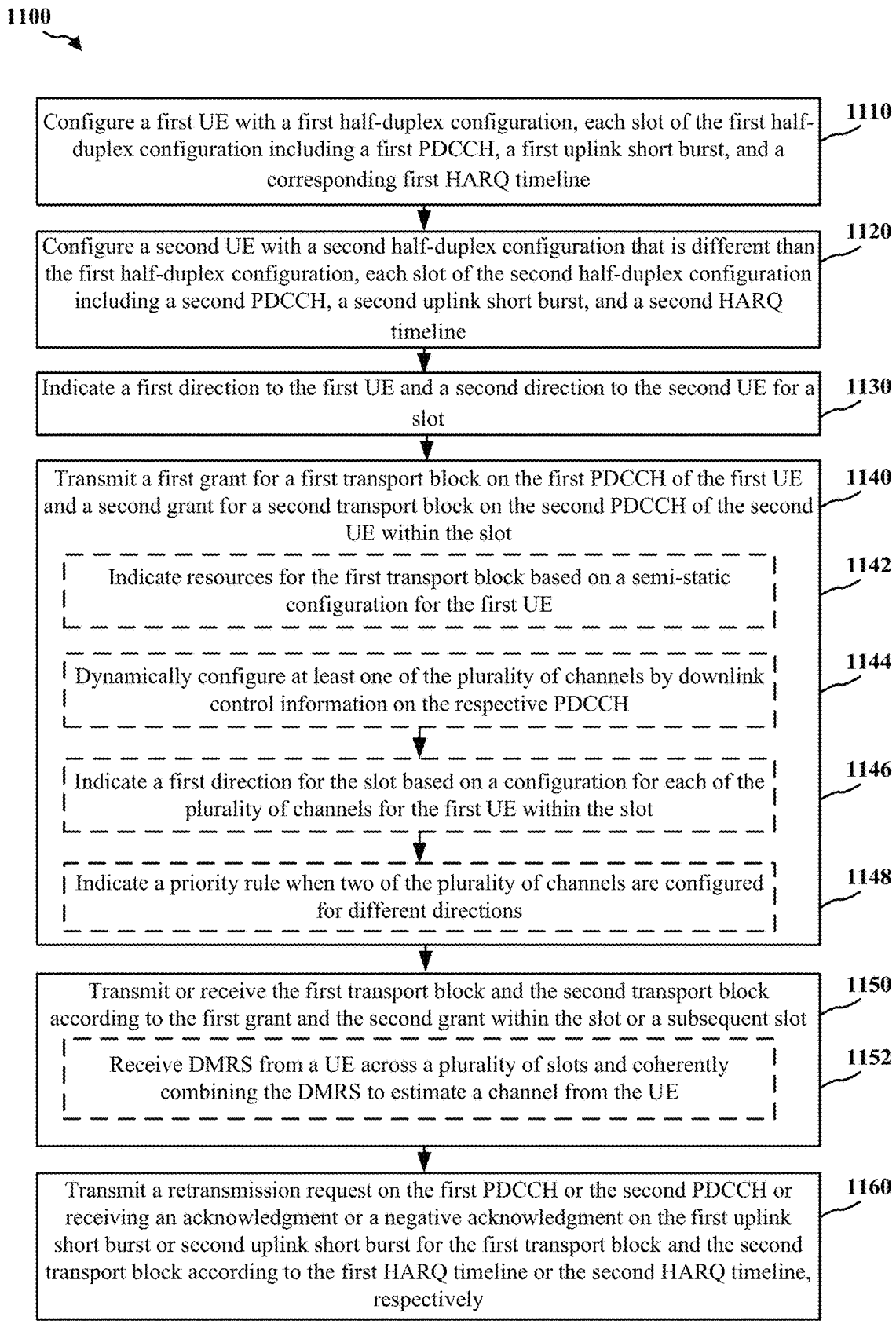
FIG. 11 is a flowchart of a method of wireless communication at an access point, in accordance with the teachings disclosed herein.

FIG. 11 is a flowchart 1100 of a method of wireless communication. The method may be performed by a base station (e.g., the base station 102/180; the apparatus 1202). Optional aspects are illustrated with a dashed line. The method may facilitate reducing UE complexity by enabling HD UE operation in FDD bands.

At 910, the base station configures a first UE with a first half-duplex configuration, each slot of the first half-duplex configuration including a first PDCCH, a first uplink short burst, and a corresponding first HARQ timeline, as described in connection with, for example, the first HD UE 402 and the first HD configuration 610 of FIGS. 4 and 6. For example, a configuration component 1244 of the apparatus 1202 may be configured to configure the first UE with the first half-duplex configuration. For example, the base station may configure the first HD UE 402 with a first HD configuration 610. Each slot 650 of the first HD configuration 610 may include a first PDCCH 612, a first uplink short burst 616 and a corresponding HARQ timeline 710.

At 1120, the base station configures at least one second UE with a second half-duplex configuration that is different than the first half-duplex configuration, each slot of the second half-duplex configuration including a second PDCCH, a second uplink short burst, and a second HARQ timeline, as described in connection with, for example, the second HD UE 404 and the second HD configuration 620 of FIGS. 4 and 6. For example, the configuration component 1244 of the apparatus 1202 may be configured to configure the second UE with the second half-duplex configuration.

At 1130, the base station indicates a first direction to the first UE and a second direction to the second UE for a slot, as described in connection with, for example, the HARQ timelines 710, 730 of FIG. 7. For example, an indication component 1250 of the apparatus 1202 may be configured to indicate a first direction to the first UE and a second direction to the second UE for the slot. In some examples, the base station may indicate the respective direction to the UEs based on respective semi-static configurations for the UEs. In some examples, the base station may indicate the respective directions to the UEs based on a configuration for each of a plurality of channels within the slot.

At 1140, the base station transmits a first grant for a first transport block on the first PDCCH of the first UE and a second grant for a second transport block on the second PDCCH of the second UE within the slot, as described in connection with, for example, the grants 712, 732 for the transport blocks 714, 734 of FIG. 7. For example, a grant component 1246 of the apparatus 1202 may be configured to transmit a first grant for a first transport block on the first PDCCH of the first UE and a second grant for a second transport block on the second PDCCH of the second UE within the slot. For example, the base station may transmit the first grant (e.g., the DL grant 712) for a first transport block 714 on the first PDCCH 612 of the first HD UE 402 and a second grant (e.g., the DL grant 732) for a second transport block 734 on the second PDCCH of the second UE within the slot 750. It may be appreciated that the base station may configure other combinations of grants within a slot. For example, the base station may transmit a DL grant 716 to the first HD UE 402 and an UL grant 740 to the second UE 404 in the slot 752. In some examples, the base station may additionally or alternatively transmit a grant to a third UE having the first HD configuration 610 that is the same as the first HD UE 402. For instance, the grant component 1246 may transmit the UL grant 720 to the third UE in the slot 750.

In some examples, the base station may, at 1142, indicate resources for the first transport block based on a semi-state configuration for the first UE, as described in connection with, for example, the DL transport block 714 or the UL transport block 722 of FIG. 7. For example, the indication component 1250 of the apparatus 1202 may be configured to indicate resources for the first transport block based on the semi-static configuration for the first UE. For example, the base station may indicate the direction for the transport block (e.g., the DL transport block 714 or the UL transport block 722) based on a semi-static configuration for the first HD UE 402. The base station may also determine the direction for the second transport block based on a semi-static configuration for the second HD UE 404, which may be different than the semi-static configuration for the first HD UE 402. For example, in the slot 754, the first HD UE 402 may be configured with a DL slot while the second HD UE 404 may be configured with an UL slot.

In some examples, the base station may, at 1144, dynamically configure at least one of a plurality of channels by downlink control information on a respective PDCCH, as described in connection with, for example, the PDSCH 614 or the UL long burst 618 of FIG. 6. For example, a channels component 1252 may be configured to dynamically configure at least one of a plurality of channels by DCI on a respective PDCCH. For example, the base station may dynamically configure at least one of a plurality of channels (e.g., the PDSCH 614 or the UL long burst 618) by transmitting a DCI on the PDCCH 612.

At 1146, the base station may indicate the first direction for the slot based on a configuration for each of the plurality of channels for the first UE within the slot, as described in connection with, for example, the slots 650 of FIG. 6. For example, a direction component 1248 of the apparatus 1202 may be configured to indicate the first direction for the slot based on a configuration for each of the plurality of channels for the first UE within the slot. For example, the configuration of the channel may indicate the direction.

In some examples, the base station may indicate, at 1148, a priority rule when two of the plurality of channels are configured for different directions. For example, the directions component 1248 of the apparatus 1202 may be configured to indicate the priority rule when two of the plurality of channels are configured for different directions.

At 1150, the base station transmits or receives the first transport block and the second transport block according to the first grant and the second grant within the slot or a subsequent slot, as described in connection with, for example, the slots 450 and 452 of FIG. 4. For example, a communication component 1254 may be configured to transmit or receive the first transport block and the second transport block according to the first grant and the second grant within the slot or a subsequent slot.

In some examples, the base station may receive, at 1152, DMRS from a UE across a plurality of slots and coherently combine the DMRS to estimate a channel from the UE, as described in connection with, for example, the FIGS. 8A and 8B. For example, a DMRS component 1240 of the apparatus 1202 may be configured to receive DMRS from a UE across a plurality of slots and coherently combine the DMRS to estimate a channel from the UE.

At 1160, the base station may transmit a retransmission request on the first PDCCH or the second PDCCH or receive an ACK or a NACK on the first uplink short burst or second uplink short burst for the first transport block and the second transport block according to the first HARQ timeline or the second HARQ timeline, respectively, as described in connection with, for example, the DL grant 412 and the transport block 422 of FIG. 4. For example, a HARQ component 1242 of the apparatus 1202 may be configured to transmit a retransmission request on the first PDCCH or the second PDCCH or receive an ACK or a NACK on the first uplink short burst or second uplink short burst for the first transport block and the second transport block according to the first HARQ timeline or the second HARQ timeline, respectively. For example, the base station may transmit a retransmission request on the first PDCCH 612 or the second PDCCH 622 or receive an acknowledgment or a negative acknowledgment on the first uplink short burst 616 or second uplink short burst 626 for the first transport block and the second transport block according to the first HARQ timeline 710 or the second HARQ timeline 730, respectively. In some examples, the base station may transmit the acknowledgment in the DL grant 712 on PDCCH 612 or in the DL grant 732 on the PDCCH 622. In some examples, the base station may receive the ACK 716 on the UL short burst 616 or the ACK 736 on the UL short burst 626.

Figure 12:
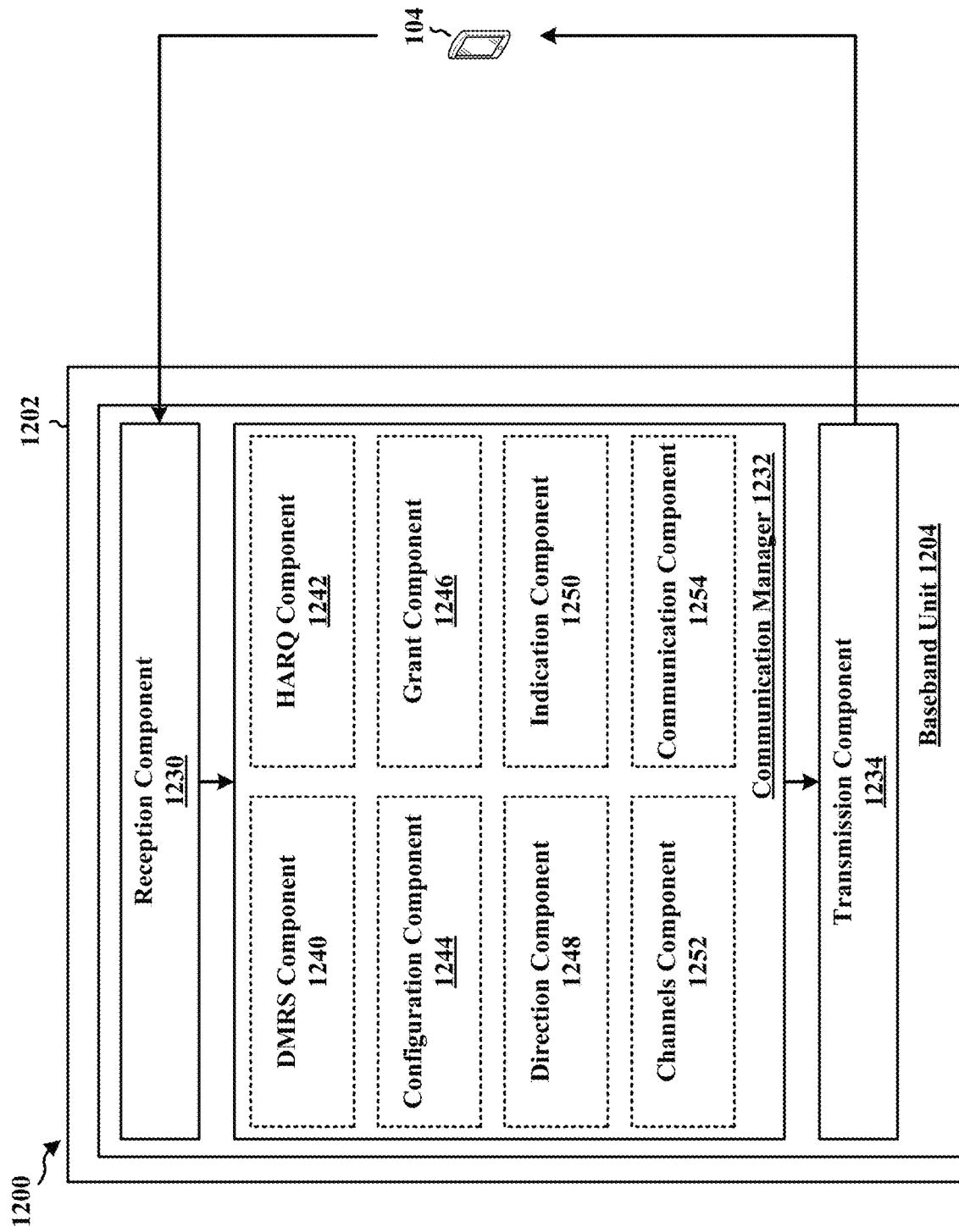
FIG. 12 is a diagram illustrating an example of a hardware implementation for an example apparatus, in accordance with the teachings disclosed herein.

FIG. 12 is a diagram 1200 illustrating an example of a hardware implementation for an apparatus 1202. The apparatus 1202 is a base station and includes a baseband unit 1204. The baseband unit 1204 may communicate through a cellular RF transceiver with the UE 104. The baseband unit 1204 may include a computer-readable medium/memory. The baseband unit 1204 is responsible for general processing, including the execution of software stored on the computer-readable medium/memory. The software, when executed by the baseband unit 1204, causes the baseband unit 1204 to perform the various functions described supra. The computer-readable medium/memory may also be used for storing data that is manipulated by the baseband unit 1204 when executing software. The baseband unit 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband unit 1204. The baseband unit 1204 may be a component of the base station 310 and may include the memory 376 and/or at least one of the TX processor 316, the RX processor 370, and the controller/processor 375.

The communication manager 1232 includes a DMRS component 1240 that is configured to facilitate receiving DMRS from a UE across a plurality of slots and coherently combine the DMRS to estimate a channel from the UE, for example, as described in connection with 1152 of FIG. 11. The communication manager 1232 further includes a HARQ component 1242 that may be configured to facilitate transmitting a retransmission request on the first PDCCH or the second PDCCH or receiving an ACK or a NACK on the first uplink short burst or second uplink short burst for the first transport block and the second transport block according to the first HARQ timeline or the second HARQ timeline, respectively, for example, as described in connection with 1160 of FIG. 11. The communication manager 1232 further includes a configuration component 1244 that may be configured to facilitate configuring the first UE with the first half-duplex configuration and configuring the second UE with the second half-duplex configuration, for example, as described in connection with 1110 and 1120 of FIG. 11. The communication manager 1232 further includes a grant component 1246 that may be configured to facilitate transmitting a first grant for a first transport block on the first PDCCH of the first UE and a second grant for a second transport block on the second PDCCH of the second UE within the slot, for example, as described in connection with 1140 of FIG. 11. The communication manager 1232 further includes a direction component 1248 that may be configured to facilitate indicating the first direction for the slot based on a configuration for each of the plurality of channels for the first UE within the slot and/or indicating the priority rule when two of the plurality of channels are configured for different directions, for example, as described in connection with 1146 and/or 1148 of FIG. 11. The communication manager 1232 further includes an indication component 1250 that may be configured to facilitate indicating a first direction to the first UE and a second direction to the second UE for the slot and/or indicating resources for the first transport block based on the semi-static configuration for the first UE, for example, as described in connection with 1130 and/or 1142 of FIG. 11. The communication manager 1232 further includes a channels component 1252 that may be configured to facilitate dynamically configuring at least one of a plurality of channels by DCI on a respective PDCCH, for example, as described in connection with 1144 of FIG. 11. The communication manager 1232 further includes a communication component 1254 that may be configured to facilitate transmitting or receiving the first transport block and the second transport block according to the first grant and the second grant within the slot or a subsequent slot, for example, as described in connection with 1150 of FIG. 11.

The apparatus may include additional components that perform each of the blocks of the algorithm in the aforementioned flowchart of FIG. 11. As such, each block in the aforementioned flowchart of FIG. 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the baseband unit 1204, includes means for configuring a first UE with a first half-duplex configuration, each slot of the first half-duplex configuration including a first PDCCH, a first uplink short burst, and a corresponding first HARQ timeline and for configuring a second UE with a second half-duplex configuration that is different than the first half-duplex configuration, each slot of the second half-duplex configuration including a second PDCCH, a second uplink short burst, and a second HARQ timeline. The example apparatus 1202 may further include means for indicating a first direction to the first UE and a second direction to the second UE within the slot. The example apparatus 1202 may further include means for transmitting a first grant for a first transport block on the first PDCCH of the first UE and a second grant for a second transport block on the second PDCCH of the second UE within a slot. The example apparatus 1202 may further include means for transmitting or receiving the first transport block and the second transport block according to the first grant and the second grant within the slot or a subsequent slot. The example apparatus 1202 may further include means for transmitting a retransmission request on the first PDCCH or the second PDCCH or receiving an acknowledgment or a negative acknowledgment on the first uplink short burst or second uplink short burst for the first transport block and the second transport block according to the first HARQ timeline or the second HARQ timeline, respectively. The example apparatus 1202 may further include means for transmitting a configuration to the UE indicating whether to transmit the DMRS in a downlink slot.

The aforementioned means may be one or more of the aforementioned components of the apparatus 1202 configured to perform the functions recited by the aforementioned means. As described supra, the apparatus 1202 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The following examples are illustrative only and may be combined with aspects of other embodiments or teachings described herein, without limitation.

Example 1 is a method of wireless communication at a User Equipment (UE), comprising: determining, by the UE, a half-duplex configuration for use in communicating with an access point, each slot of the half-duplex configuration including at least a physical downlink control channel (PDCCH) on a downlink frequency and an uplink short burst on an uplink frequency, and each slot associated with a hybrid automatic repeat request (HARQ) timeline; determining a direction for a slot; and transmitting or receiving according to the direction for the slot and the half-duplex configuration.

In Example 2, the method of Example 1 further includes that the half-duplex configuration defines a timing gap between uplink slots, a timing gap between downlink slots, or a timing gap between uplink slots and downlink slots.

In Example 3, the method of any of Example 1 or Example 2 further includes that the timing gap is predetermined, signaled to the UE, or derived from a timing for the PDCCH.

In Example 4, the method of any of Examples 1 to 3 further includes that determining the direction for the slot comprises determining the direction based on a semi-static configuration for the UE.

In Example 5, the method of any of Examples 1 to 4 further includes that determining the direction for the slot comprises: determining a direction for each of a plurality of channels within the slot based on a configuration for each of the plurality of channels; and determining the direction for the slot based on a priority rule when two of the plurality of channels are configured for different directions.

In Example 6, the method of any of Examples 1 to 5 further includes that at least one of the plurality of channels is dynamically configured by downlink control information on the PDCCH.

In Example 7, the method of any of Examples 1 to 6 further includes that the priority rule indicates an order of channels.

In Example 8, the method of any of Examples 1 to 7 further includes that the UE is configured to transmit a demodulation reference signal (DMRS) across a plurality of slots, wherein transmitting or receiving according to the direction for the slot and the half-duplex configuration is further based on the DMRS for the slot.

In Example 9, the method of any of Examples 1 to 8 further includes that the direction is downlink and transmitting or receiving according to the direction for the slot and the half-duplex configuration comprises transmitting the DMRS in symbols that do not collide with a downlink transport block or measurement.

In Example 10, the method of any of Examples 1 to 9 further includes that the direction is uplink when a DMRS is scheduled for transmission.

In Example 11, the method of any of Examples 1 to 10 further includes that the UE abstains from transmitting the DMRS when the direction is downlink.

In Example 12, the method of any of Examples 1 to 11 further includes receiving a configuration indicating whether to transmit the DMRS in a downlink slot.

In Example 13, the method of any of Examples 1 to 12 further includes that transmitting or receiving according to the direction for the slot and the half-duplex configuration comprises transmitting the DMRS according to a priority indication for an uplink transmission.

In Example 14, the method of any of Examples 1 to 13 further includes that the priority indication is one of a downlink control information (DCI) format, a DCI bit field, a radio network temporary identifier (RNTI), a control resource set (CORESET) or search space set index, or a logical channel.

Example 15 is a device including one or more processors and one or more memories in electronic communication with the one or more processors storing instructions executable by the one or more processors to cause a system or an apparatus to implement a method as in any of Examples 1 to 14.

Example 16 is a system or apparatus including means for implementing a method or realizing an apparatus as in any of Examples 1 to 14.

Example 17 is a non-transitory computer-readable medium storing instructions executable by one or more processors to cause the one or more processors to implement a method as in any of Examples 1 to 14.

Example 18 is a method of wireless communication at an access point, comprising: configuring a first user equipment (UE) with a first half-duplex configuration, each slot of the first half-duplex configuration including a first physical downlink control channel (PDCCH), a first uplink short burst, and a corresponding first hybrid automatic repeat request (HARQ) timeline; configuring a second UE with a second half-duplex configuration that is different than the first half-duplex configuration, each slot of the second half-duplex configuration including a second PDCCH, a second uplink short burst, and a second HARQ timeline; indicating a first direction to the first UE and a second direction to the second UE for a slot; transmitting a first grant for a first transport block on the first PDCCH of the first UE and a second grant for a second transport block on the second PDCCH of the second UE within the slot; transmitting or receiving the first transport block and the second transport block according to the first grant and the second grant within the slot or a subsequent slot; and transmitting acknowledgment retransmission request on the first PDCCH or the second PDCCH or receiving an acknowledgment or a negative acknowledgment on the first uplink short burst or the second uplink short burst for the first transport block and the second transport block according to the first HARQ timeline or the second HARQ timeline, respectively.

In Example 19, the method of Example 18 further includes that each half-duplex configuration defines a timing gap between uplink slots.

In Example 20, the method of any of Example 18 or Example 19 further includes that the timing gap is predetermined, signaled to a respective UE, or derived from a respective PDCCH timing.

In Example 21, the method of any of Examples 18 to 20 further includes that the first grant indicates resources for the first transport block based on a semi-static configuration for the first UE, and wherein the direction is based on the semi-static configuration for the first UE.

In Example 22, the method of any of Examples 18 to 21 further includes that the base station indicates the first direction for the slot based on a configuration for each of a plurality of channels within the slot for the first UE, and wherein the first direction for the slot is based on a priority rule when two of the plurality of channels are configured for different directions.

In Example 23, the method of any of Examples 18 to 22 further includes that transmitting the first grant comprises dynamically configuring at least one of the plurality of channels by downlink control information on the respective PDCCH.

In Example 24, the method of any of Examples 18 to 23 further includes that the priority rule indicates an order of channels.

In Example 25, the method of any of Examples 18 to 24 further includes that receiving the first transport block according to the first grant comprises receiving demodulation reference signals (DMRS) from the first UE across a plurality of slots and coherently combining the DMRS to estimate a channel from the first UE.

In Example 26, the method of any of Examples 18 to 25 further includes that the first grant for the first UE in the slot is a downlink grant and receiving the first transport block comprises receiving the DMRS in symbols that do not collide with a downlink transport block or measurement in the slot.

In Example 27, the method of any of Examples 18 to 26 further includes that transmitting the first grant comprises transmitting an uplink grant when a DMRS is scheduled for transmission in the slot.

In Example 28, the method of any of Examples 18 to 27 further includes that receiving the DMRS from the first UE across the plurality of slots comprises refraining from receiving a scheduled DMRS in the slot in response to transmitting a downlink grant for the slot for the first UE.

In Example 29, the method of any of Examples 18 to 28 further includes transmitting a configuration to the first UE indicating whether to transmit the DMRS in a downlink slot.

In Example 30, the method of any of Examples 18 to 29 further includes that receiving the DMRS from the first UE across the plurality of slots is based on a priority indication for the respective transport block.

In Example 31, the method of any of Examples 18 to 30 further includes that the priority indication is one of a downlink control information (DCI) format, a DCI bit field, a radio network temporary identifier (RNTI), a control resource set (CORESET) or search space set index, or a logical channel.

Example 32 is a device including one or more processors and one or more memories in electronic communication with the one or more processors storing instructions executable by the one or more processors to cause a system or an apparatus to implement a method as in any of Examples 18 to 31.

Example 33 is a system or apparatus including means for implementing a method or realizing an apparatus as in any of Examples 18 to 31.

Example 34 is a non-transitory computer-readable medium storing instructions executable by one or more processors to cause the one or more processors to implement a method as in any of Examples 18 to 31.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
    determining, by the UE, a half-duplex configuration for use in communicating with an access point, each slot of the half-duplex configuration including at least a physical downlink control channel (PDCCH) on a downlink frequency and an uplink short burst on an uplink frequency of a frequency division duplexed frame structure, and each slot associated with a hybrid automatic repeat request (HARQ) timeline, the downlink frequency associated with first subframes of a set of subcarriers and dedicated to downlink traffic, the uplink frequency associated with second subframes of the set of subcarriers and dedicated to uplink traffic, the second subframes being different than the first subframes;
    determining a first direction for a slot, the first direction being different than a second direction associated with another UE for the slot; and
    transmitting or receiving according to the first direction for the slot and the half-duplex configuration.

2. The method of claim 1, wherein the half-duplex configuration identifies a timing gap, wherein the timing gap corresponds to a gap between uplink slots, a gap between downlink slots, or a gap between the uplink slots and the downlink slots.

3. The method of claim 2, wherein the timing gap is predetermined, signaled to the UE, or derived from a timing for the PDCCH.

4. The method of claim 1, wherein the first direction is based on a semi-static configuration for the UE.

5. The method of claim 1, wherein determining the first direction for the slot comprises:
determining respective directions for each of a plurality of channels within the slot based on a configuration for each of the plurality of channels; and
determining the first direction for the slot based on a priority rule when two of the plurality of channels are configured for different respective directions.

6. The method of claim 5, wherein at least one of the plurality of channels is configured by downlink control information on the PDCCH.

7. The method of claim 5, wherein the priority rule indicates an order of channels.

8. The method of claim 1, wherein the UE is configured to transmit a demodulation reference signal (DMRS) across a plurality of slots, wherein transmitting or receiving according to the first direction for the slot and the half-duplex configuration is further based on the DMRS for the slot.

9. The method of claim 8, wherein the first direction is downlink and transmitting or receiving according to the first direction for the slot and the half-duplex configuration comprises transmitting the DMRS in symbols that do not collide with a downlink transport block or measurement.

10. The method of claim 8, wherein the first direction is uplink when the DMRS is scheduled for transmission.

11. The method of claim 8, wherein the UE abstains from transmitting the DMRS when the first direction is downlink.

12. The method of claim 8, further comprising receiving a configuration indicating whether to transmit the DMRS in a downlink slot.

13. The method of claim 8, wherein transmitting or receiving according to the first direction for the slot and the half-duplex configuration comprises transmitting the DMRS according to a priority indication for an uplink transmission.

14. The method of claim 13, wherein the priority indication is one of a downlink control information (DCI) format, a DCI bit field, a radio network temporary identifier (RNTI), a control resource set (CORESET) or search space set index, or a logical channel.

15. The method of claim 8, wherein the UE abstains from transmitting the DMRS when the first direction for the slot is uplink and a downlink broadcast channel is scheduled for the slot.

16. An apparatus for wireless communication at a user equipment (UE), comprising:
a memory; and
at least one processor coupled to the memory and configured to:
determine, by the UE, a half-duplex configuration for use in communicating with an access point, each slot of the half-duplex configuration including at least a physical downlink control channel (PDCCH) on a downlink frequency and an uplink short burst on an uplink frequency of a frequency division duplexed frame structure, and each slot associated with a hybrid automatic repeat request (HARQ) timeline, the downlink frequency associated with first subframes of a set of subcarriers and dedicated to downlink traffic, the uplink frequency associated with second subframes of the set of subcarriers and dedicated to uplink traffic, the second subframes being different than the first subframes;
determine a first direction for a slot, the first direction being different than a second direction associated with another UE for the slot; and
transmit or receiving according to the first direction for the slot and the half-duplex configuration.

17. A method of wireless communication at an access point, comprising:
configuring a first user equipment (UE) with a first half-duplex configuration, each slot of the first half-duplex configuration including a first physical downlink control channel (PDCCH) on a downlink frequency of a frequency division duplexed (FDD) frame structure, a first uplink short burst on an uplink frequency of the FDD frame structure, and a first hybrid automatic repeat request (HARQ) timeline, the downlink frequency associated with first subframes of a set of subcarriers and dedicated to downlink traffic, the uplink frequency associated with second subframes of the set of subcarriers and dedicated to uplink traffic, the second subframes being different than the first subframes;
configuring a second UE with a second half-duplex configuration that is different than the first half-duplex configuration, each slot of the second half-duplex configuration including a second PDCCH on the downlink frequency of the FDD frame structure, a second uplink short burst on the uplink frequency of the FDD frame structure, and a second HARQ timeline;
indicating a first direction to the first UE and a second direction to the second UE for a slot, the first direction being different than the second direction for the slot;
transmitting a first grant for a first transport block on the first PDCCH of the first UE and a second grant for a second transport block on the second PDCCH of the second UE within the slot;
transmitting or receiving the first transport block and the second transport block according to the first grant and the second grant within the slot or a subsequent slot; and
transmitting a retransmission request on the first PDCCH or the second PDCCH or receiving an acknowledgment or a negative acknowledgment on the first uplink short burst or the second uplink short burst for the first transport block and the second transport block according to the first HARQ timeline or the second HARQ timeline, respectively.

18. The method of claim 17, wherein each half-duplex configuration defines a timing gap between uplink slots.

19. The method of claim 18, wherein the timing gap is predetermined, signaled to a respective UE, or derived from a respective PDCCH timing.

20. The method of claim 17, wherein the first grant indicates resources for the first transport block based on a semi-static configuration for the first UE, and wherein the first direction is based on the semi-static configuration for the first UE.

21. The method of claim 17, wherein the access point indicates the first direction for the slot based on a configuration for each of a plurality of channels within the slot for the first UE, and wherein the first direction for the slot is based on a priority rule when two of the plurality of channels are configured for different respective directions.

22. The method of claim 21, wherein transmitting the first grant comprises configuring at least one of the plurality of channels by downlink control information on a respective PDCCH.

23. The method of claim 22, wherein the priority rule indicates an order of channels.

24. The method of claim 17, wherein receiving the first transport block according to the first grant comprises receiving demodulation reference signals (DMRS) from the first UE across a plurality of slots and coherently combining the DMRS to estimate a channel from the first UE.

25. The method of claim 24, wherein the first grant for the first UE in the slot is a downlink grant and receiving the first transport block comprises receiving the DMRS in symbols that do not collide with a downlink transport block or measurement in the slot.

26. The method of claim 24, wherein transmitting the first grant comprises transmitting an uplink grant when the DMRS is scheduled for transmission in the slot.

27. The method of claim 24, wherein receiving the DMRS from the first UE across the plurality of slots comprises refraining from receiving a scheduled DMRS in the slot in response to transmitting a downlink grant for the slot for the first UE.

28. The method of claim 24, further comprising transmitting a configuration to the first UE indicating whether to transmit the DMRS in a downlink slot.

29. The method of claim 24, wherein receiving the DMRS from the first UE across the plurality of slots is based on a priority indication for a respective transport block.

30. The method of claim 29, wherein the priority indication is one of a downlink control information (DCI) format, a DCI bit field, a radio network temporary identifier (RNTI), a control resource set (CORESET) or search space set index, or a logical channel.

31. An apparatus for wireless communication at a base station, comprising:
a memory; and
at least one processor coupled to the memory and configured to:
configure a first user equipment (UE) with a first half-duplex configuration, each slot of the first half-duplex configuration including a first physical downlink control channel (PDCCH) on a downlink frequency of a frequency division duplexed (FDD) frame structure, a first uplink short burst on an uplink frequency of the FDD frame structure, and a first hybrid automatic repeat request (HARQ) timeline, the downlink frequency associated with first subframes of a set of subcarriers and dedicated to downlink traffic, the uplink frequency associated with second subframes of the set of subcarriers and dedicated to uplink traffic, the second subframes being different than the first subframes;
configure a second UE with a second half-duplex configuration that is different than the first half-duplex configuration, each slot of the second half-duplex configuration including a second PDCCH on the downlink frequency of the FDD frame structure, a second uplink short burst on the uplink frequency of the FDD frame structure, and a second HARQ timeline;
indicate a first direction to the first UE and a second direction to the second UE for a slot, the first direction being different than the second direction for the slot;
transmit a first grant for a first transport block on the first PDCCH of the first UE and a second grant for a second transport block on the second PDCCH of the second UE within the slot;
transmit or receive the first transport block and the second transport block according to the first grant and the second grant within the slot or a subsequent slot; and
transmit a retransmission request on the first PDCCH or the second PDCCH or receive an acknowledgment or a negative acknowledgment on the first uplink short burst or the second uplink short burst for the first transport block and the second transport block according to the first HARQ timeline or the second HARQ timeline, respectively.

* * * * *